US012756880B2

(12) United States Patent
Kurup

(10) Patent No.: US 12,756,880 B2
(45) **Date of Patent: *Oct. 6, 2026**

(54) METHOD AND SYSTEM FOR VIDEO QUALITY MONITORING

(71) Applicant: Comcast Cable Communications, LLC, Philadelphia, PA (US)

(72) Inventor: Sajay Janardhana Kurup, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/410,312

(22) Filed: Jan. 11, 2024

(65) Prior Publication Data

US 2024/0205475 A1 Jun. 20, 2024

Related U.S. Application Data

(63) Continuation of application No. 18/159,762, filed on Jan. 26, 2023, now Pat. No. 11,917,225, which is a continuation of application No. 16/713,762, filed on Dec. 13, 2019, now Pat. No. 11,595,709.

(51) Int. Cl.

*H04N 21/24* (2011.01)
*H04N 17/04* (2006.01)
*H04N 21/2343* (2011.01)

(52) U.S. Cl.

CPC ......... *H04N 21/2407* (2013.01); *H04N 17/04* (2013.01); *H04N 21/23439* (2013.01)

(58) Field of Classification Search

CPC ............... H04N 21/2407; H04N 17/04; H04N 21/23439; H04N 21/24; H04N 21/6582; H04N 21/44008; H04N 17/004; H04N 21/4425

See application file for complete search history.

(56) References Cited

U.S. PATENT DOCUMENTS

| | | | | |
|---|---|---|---|---|
| 5,652,627 | A | 7/1997 | Allen | |
| 9,351,039 | B2 | 5/2016 | Savoor et al. | |
| 2016/0066002 | A1 * | 3/2016 | Dachiraju | G06Q 20/123 725/2 |
| 2019/0082339 | A1 * | 3/2019 | Dion | H04N 21/64738 |

FOREIGN PATENT DOCUMENTS

| | | |
|---|---|---|
| EP | 2524515 B1 | 5/2018 |

* cited by examiner

*Primary Examiner* — Kunal Langhnoja

(74) *Attorney, Agent, or Firm* — Banner & Witcoff, Ltd.

(57) ABSTRACT

Systems, apparatuses, and methods are described for detecting malfunctions of computing devices causing outputs of video content. Partially or fully static content frames may be detected, and, indications may be generated based on the static content frames. The indications may be analyzed to identify computing devices with degraded performance. Diagnostic tests may be run by the identified computing devices and/or other actions performed based on a determination of static content frames.

21 Claims, 14 Drawing Sheets

METHOD AND SYSTEM FOR VIDEO QUALITY MONITORING

CROSS-REFERENCE TO RELATED APPLICATIONS

This application is a continuation of U.S. patent application Ser. No. 18/159,762, filed on Jan. 26, 2023, which is a continuation of and claims priority to U.S. patent application Ser. No. 16/713,762 (now U.S. Pat. No. 11,595,709), filed on Dec. 13, 2019. Each of the aforementioned applications is hereby incorporated by reference herein in its entirety.

BACKGROUND

Content providers may deliver content to users via set-top boxes (STBs). STBs are generally used to receive and process signals for content items, and display on a display device (e.g., a television) a series of content frames. An STB with degraded performance may cause display of "frozen" or "jittery" content frames. Objects in frozen content frames remain static, resulting in a prolonged display of a single image. Jittery content frames comprise one or more regions that are static. The STB may also cause the output of static content frames with objects that are intentionally static and not the result of any degraded performance of the STB.

SUMMARY

The following summary presents a simplified summary of certain features. The summary is not an extensive overview and is not intended to identify key or critical elements.

Video quality tests may be performed on new or used computing devices (e.g., STBs) in a laboratory setting and/or on computing devices deployed at subscribers' premises. Systems, apparatuses, and methods are described for analyzing the video quality of the computing devices and determining computing devices that may be experiencing performance degradation. Computing devices may detect partially or fully static content frames being output and may send indications regarding the partially or fully static content frames to a quality control server. The quality control server may receive the indications and distinguish computing devices experiencing frozen content frames from computing devices that may be causing an output of content that is intentionally static. The computing devices that are not causing an output of intentionally static content frames may be determined to be malfunctioning and/or otherwise experiencing performance degradation. Diagnostic testing and/or other steps may be taken for computing devices determined to have degraded performance.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
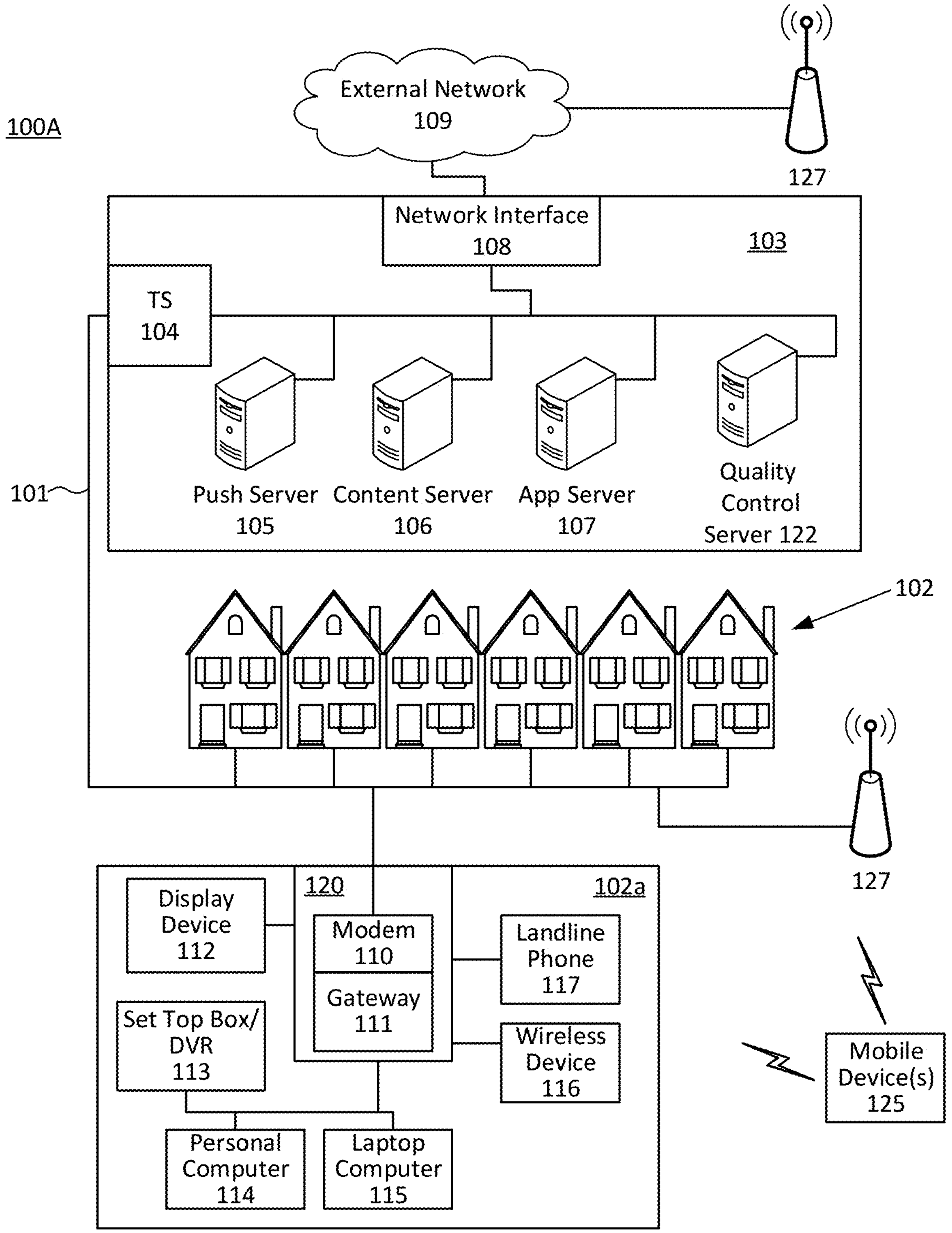
FIG. 1A shows an example communication network.

The accompanying drawings, which form a part hereof, show examples of the disclosure. It is to be understood that the examples shown in the drawings and/or discussed herein are non-exclusive and that there are other examples of how the disclosure may be practiced.

A set-top box (STB) is a type of computing device that may comprise one or more tuners, modems, or other components for receiving a transmission of content, and that may comprise one or more processors, memory, and/or other components that allow a received signal for content items (e.g., movies, television programs, sporting events, etc.) to be received, decoded and displayed on a display device (e.g., a television), for example, as a series of content frames output via the display device. The signal source may be from an Ethernet cable, a satellite dish, a coaxial cable, a telephone line, broadband over power lines (BPL), or even an ordinary VHF or UHF antenna. STBs may be used in cable television, satellite television, and over-the-air television systems, etc. Although STBs are included in various examples herein, the systems, apparatuses, and methods described herein may be used in connection with other types of computing devices that output or that cause output of video or other content.

A computing device may cause a display of static content frames (i.e., video content with no moving images) in at least three types of situations. First, the computing device may merely cause the output of content that is intentionally static. Examples of intentionally static content may comprise, but are not limited to, still or banner advertisements, emergency alerts, splash screens, freeze-frames in an action replay during the broadcasting of a sporting event, screens indicating loading or updating of software applications, scenes in a movie that are intentionally unchanging for an extended period, etc. Second, instead of causing display of video content with moving images, the degraded performance of a computing device (e.g., an STB) may cause the repeated output of a single frame or output of multiple frames that are unintentionally static, resulting in prolonged display a single image. This phenomenon is sometimes known as "frozen" frame(s), frozen screens, frozen output, etc. Third, another form of frozen frame performance degradation may comprise a sequence of content frames in which the same portion of content frames (e.g., regions corresponding to a specific region of a display device screen) are frozen. This is phenomenon is also sometimes known as "jitters."

Diagnostic testing can be performed in computing devices to identify causes of performance degradation. The performance degradation may arise from the malfunctioning of the computing devices and/or issues with the content providers. However, before such diagnostic tests are performed, it may be useful to determine whether a computing device is actually experiencing frozen frame or other actual performance degradation, or whether the computing device is merely causing the output of content that is intentionally static.

FIG. 1 shows an example communication network 100A in which features described herein may be implemented. The communication network 100A may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100A may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the quality control server 122 (described below), additional push, content, and/or application servers, and/or other types of servers. Although shown separately, the push server 105, the content server 106, the application server 107, the video quality control server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise an STB, digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

The quality control server 122 in the local office 103 (e.g., a headend) may receive reports of static content frames from one or more computing devices (e.g., STBs) in the premises 102 in the system 100A. The computing devices in the premises 102 may be configured may send indications to the quality control server 122 when the computing devices output static content frames. The quality control server 122 may analyze the received indications to identify one or more computing devices that are malfunctioning and/or that have degraded video output. The quality control server 122 may also monitor the computing devices in the premises 102, detect static frames outputted by the computing devices, and determine whether the computing devices are malfunctioning and/or have degraded video output.

Figure 1B:
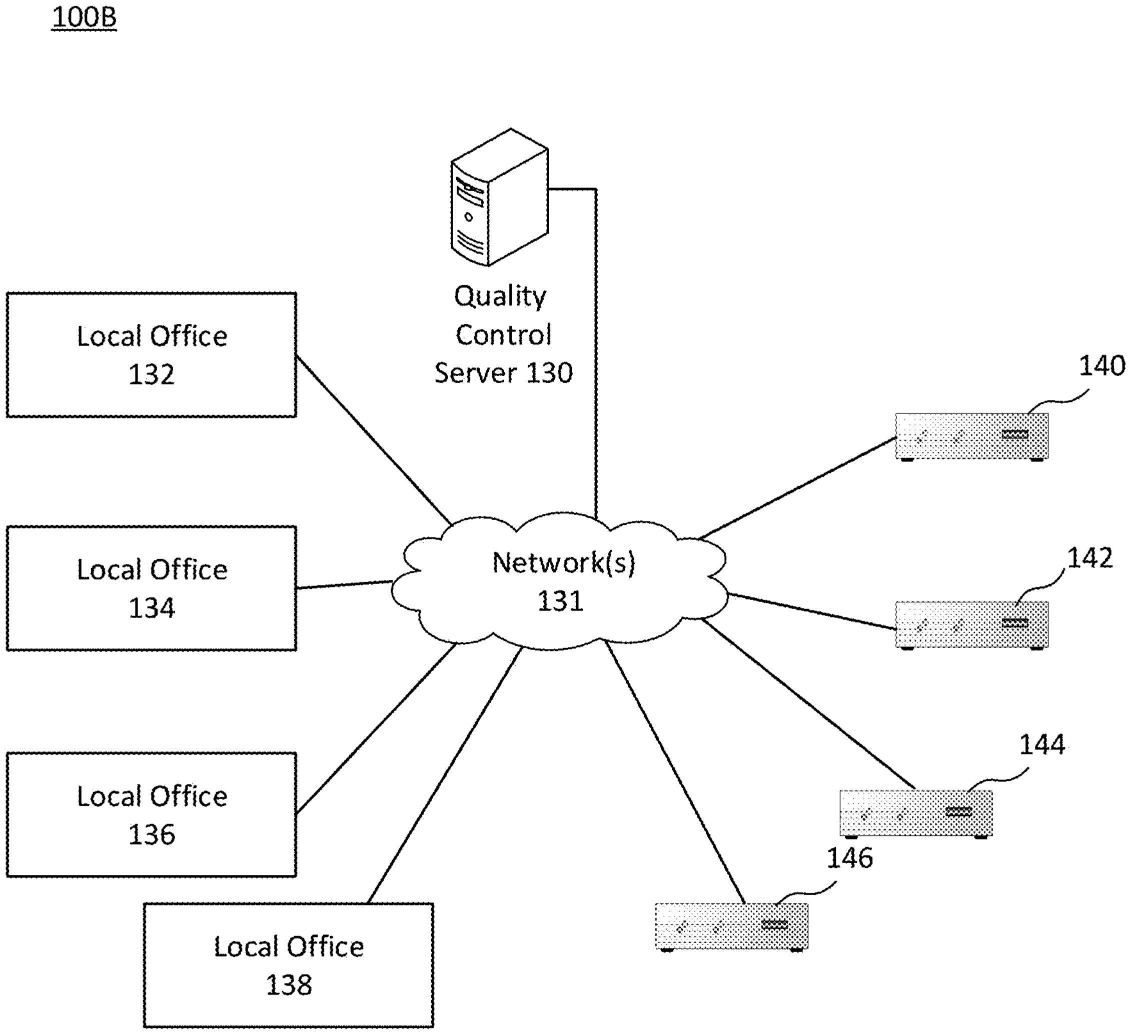
FIG. 1B shows an example system for testing computing devices from multiple local offices.

FIG. 1B shows an example system 100B comprising a quality control server 130. The quality control server 130 may receive indications of static frames from computing devices in communication with local offices in one or more regions (e.g., one or more regions within a county and/or state, one or more regions comprising one or more counties or states, and/or one or more other regions), and/or the quality control server 130 may receive indications of static frames from computing devices distributed in a region. The system 100B comprises the network(s) 131 (e.g., the Internet, LAN, WAN, WiFi, wireless such as 5G and other networks), a local office 132, a local office 134, a local office 136, a local office 138, computing devices 140, 142, 144, 146, and the quality control server 130. The local office 132, the local office 134, the local office 136, the local office 138, and the computing devices 140, 142, 144, 146 may be connected to the quality control server 130 via the network 131 and/or other network(s). The local office 132, the local office 134, the local office 136, the local office 138, may be associated with the same region or may be associated with different regions. Similarly, the computing devices 140, 142, 144, 146 may be located in or otherwise associated with the same region, or may be associated with different regions. The quality control server 130 may analyze the received indications to identify one or more computing devices that are malfunctioning and/or that have degraded video output. The quality control server 122 may also monitor the computing devices 140, 142, 144, 146, and/or the computing devices in the local offices 132, 134, 136 to detect outputted static content frames. The quality control server may determine whether the computing devices are malfunctioning and/or have degraded video output. For the sake of the current discussion, only four local offices and four computing devices are shown to be connected to the quality control server 130 through the network 131. However, any number of local offices and computing devices can be connected to the quality control server 130 through the network 131.

Figure 2:
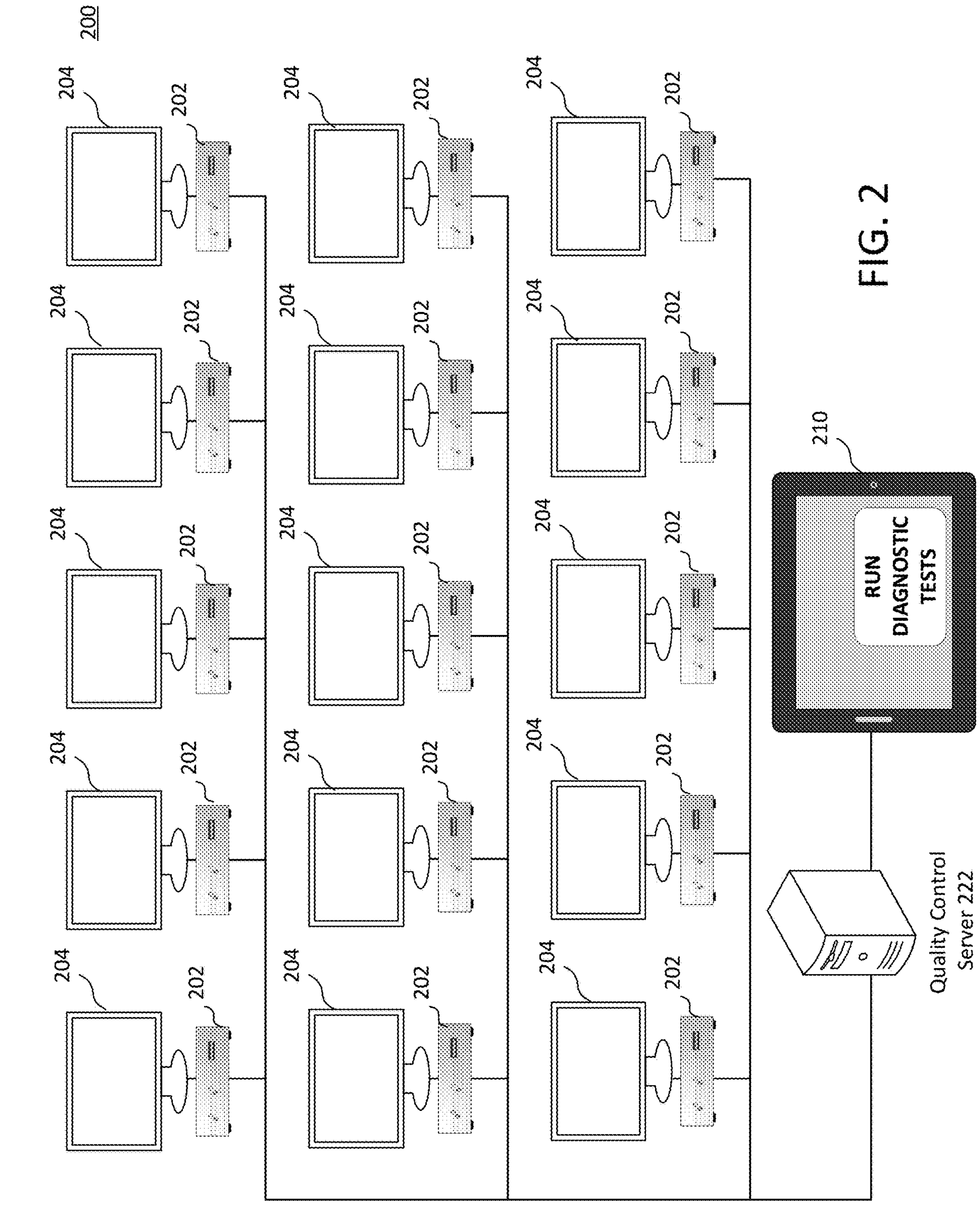
FIG. 2 shows an example system for testing computing devices.

FIG. 2 shows an example system 200 in which one or more features described herein may be implemented. The system 200 may simultaneously test multiple computing devices (e.g., STBs), such as the computing devices 202. A display device 204 may be connected to each of the computing devices 202. The computing devices 202 and coupled display devices may be located in a laboratory or other testing location and/or may be deployed in one or more premises 102. The computing devices may be coupled to a quality control server 222 (which may be the quality control server 122, the quality control server 131, a quality control server in a laboratory setting for testing computing devices and/or a different quality control server) that carries out the simultaneous testing of the computing devices 202. The quality control server 222 may simultaneously test the computing devices 202 by sending signals for one or more content items to the computing devices 202. Each of the computing devices 202 may include circuitry and/or software modules for analyzing video that is output (or caused to be output) by the computing device. If a computing device detects a sequence of partially or fully static content frames from its video output, the computing device may send indications of the static content frames to the quality control server 222. The quality control server 222 may receive the indications of static content frames from one or more computing devices in the system 200. The quality control server 222 may analyze the received indications to identify one or more computing devices that are malfunctioning and/or that have degraded video output, and/or may distinguish indications associated with degraded output from reports associated with intentionally static output. A display device 210 may be coupled to the quality control server 222 to display the test results for each computing device being tested. The display device 210 may also display information for computing devices that were found to be malfunctioning during the test. The quality control server 222 may include circuitry and/or software modules for analyzing video that is output (or caused to be output) by the computing devices 202. If the quality control server 222 detects a sequence of static content frames from multiple computing devices, the quality control server 222 may analyze the static content frames to identify one or more computing devices that are malfunctioning and/or that have degraded video output, and/or may distinguish reports associated with degraded output from reports associated with intentionally static output.

The indications sent by the computing devices (e.g., the computing devices in FIGS. 1A, 1B, and/or 2) may indicate an error. The indications may comprise error messages.

Figure 3:
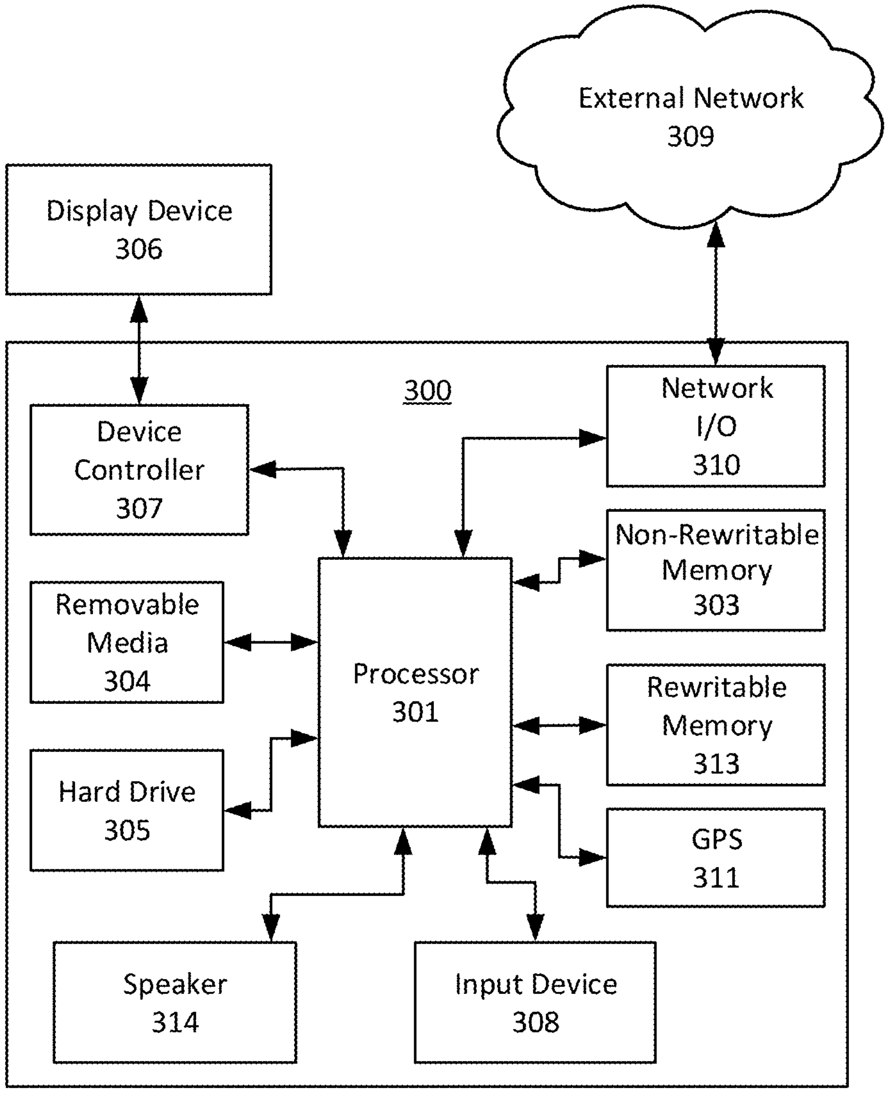
FIG. 3 shows hardware elements of an example computing device.

FIG. 3 shows hardware elements of an example computing device 300 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., STBs). The computing device 300 may comprise one or more processors 301, which may execute instructions of a computer program to perform any of the functions described herein. The instructions may be stored in a non-rewritable memory 303 such as a read-only memory (ROM), a rewritable memory 313 such as random access memory (RAM) and/or flash memory, removable media 304 (e.g., a USB drive, a compact disk (CD), a digital versatile disk (DVD)), and/or in any other type of computer-readable storage medium or memory. Instructions may also be stored in an attached (or internal) hard drive 305 or other types of storage media. The computing device 300 may comprise one or more output devices, such as a display device 306 (e.g., an external television and/or other external or internal display device) and a speaker 314, and may comprise one or more output device controllers 307, such as a video processor or a controller for an infra-red or BLUETOOTH transceiver. One or more user input devices 308 may comprise a remote control, a keyboard, a mouse, a touch screen (which may be integrated with the display device 306), a microphone, etc. The computing device 300 may also comprise one or more network interfaces, such as a network input/output (I/O) interface 310 (e.g., a network card) to communicate with an external network 309. The network I/O interface 310 may be a wired interface (e.g., electrical, RF (via coax), optical (via fiber)), a wireless interface, or a combination of the two. The network I/O interface 310 may comprise a modem configured to communicate via the external network 309. The external network 309 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 300 may comprise a location-detecting device, such as a global positioning system (GPS) microprocessor 311, which may be configured to receive and process global positioning signals and determine, with possible assistance from an external server and antenna, a geographic position of the computing device 300.

Although FIG. 3 shows an example hardware configuration, one or more of the elements of the computing device 300 may be implemented as software or a combination of hardware and software. Modifications may be made to add, remove, combine, divide, etc. components of the computing device 300. Additionally, the elements shown in FIG. 3 may be implemented using basic computing devices and components that have been configured to perform operations such as are described herein. For example, a memory of the computing device 300 may store computer-executable instructions that, when executed by the processor 301 and/or one or more other processors of the computing device 300, cause the computing device 300 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 4:
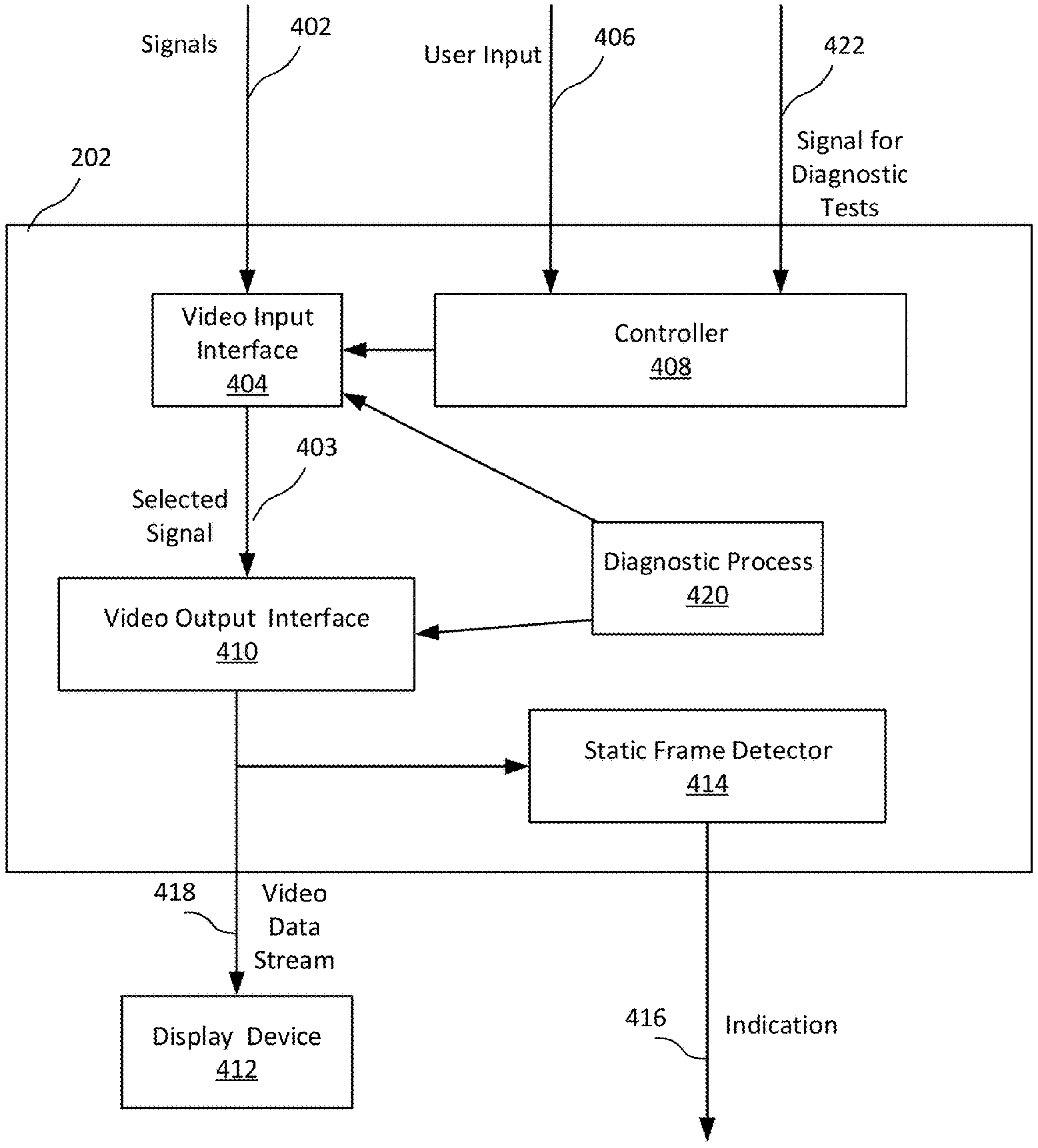
FIG. 4 is a block diagram showing an example of a computing device.

FIG. 4 shows additional details of an example computing device 202, which may be representative of one, some, or all of the computing devices 202 in FIG. 2, and in connection with which features described herein may be implemented. The computing device 202 may comprise one or more computing device(s) such as the computing device 300. The computing device 202 may output signals that cause a display device 412 (e.g., one of the display devices 204) to generate images based on content frames. The computing device 202 may comprise a video input interface 404 (e.g., the network input/output (I/O) interface 310 in FIG. 3) that may receive signals 402 (e.g., broadcast signals) from one of the backend devices such as servers 105-107 and 122 in FIG. 1. The signals 402 may be digital signals. The video input interface 404 may comprise one or more video tuners that receive the signals 402. A controller 408 (e.g., the device controller 307 in FIG. 3) may generate a command in response to user input 406 that initiates a selection of a content item. In response to commands from the controller 408, the input interface 404 may select one signal 403 from multiple digital signals contained in the signals 402. The selected signal 403 may be a stream of compressed data for a content item. The compressed data may be compressed under an MPEG (Motion Pictures Experts Group) standard, such as MPEG-2 or MPEG-4. The computing device 202 may also comprise a video output interface 410 (e.g., the network input/output (I/O) interface 310 in FIG. 3) that provides an output video data stream 418 to a display device 412. The selected signal 403 may also comprise additional information regarding the selected content item, such as a program title of the selected content item, descriptive information for the content item, a name for the service via which the content item is received by the computing device 202, an application sending the content item, etc. The video output interface 410 (e.g., the device controller 307 in FIG. 3) may comprise a decoder. The decoder may decompress the selected signal 403 to generate the video data stream 418. The video data stream 418 may comprise a stream of content frames. The computing device 202 may include software components such as a diagnostic process 420 that performs diagnostic testing routines on various components of the computing device 202. The computing device 202 may also support additional functionalities, such as electronic program guide, interactive program guides, timers, parental locks, content filters, music or video playback, video recording, and so on.

The computing device 202 may include software components such as a static frame detector 414 that analyzes the content frames in the video data stream 418. The static frame detector 414 may determine if a sequence of content frames in the video data stream 418 can be considered to be static or displaying images with no moving objects. The static frame detector 414 may also determine whether a particular portion of the sequence of content frames in the video data stream 418 is static. Static content frames may be detected in any of various ways.

For example, the static frame detector 414 may determine a sequence of static content frames by selecting two or more content frames from the sequence to form a testing sequence and determining whether content in the content frames in the testing sequence are wholly or partially static. The content frames for the testing sequence may be selected at a regular interval from the original sequence. The interval may be, for example, 0.1 second, 0.25 second, 0.5 second, 1 second, or some other interval. If the content in all of the content frames in the testing sequence is found to be substantially the same or having a degree of difference not satisfying a predetermined threshold, the original sequence may be considered to be static. The "degree of difference" between two content frames may be a "difference" distance between the content frames. Various methods for estimating the degree of difference between content frames are described below. If at least one of the content frames in the testing sequence is found to be substantially different from the other content frames in the testing sequence or having degrees of difference with the other content frames that satisfy the predetermined threshold, then at least one object in the image displayed through the original sequence may be moving, and the original sequence may be considered to be not static.

Conversely, if the content in all of the content frames in the testing sequence is determined to have a degree of similarity satisfying or exceeding a predetermined threshold, the original sequence may be considered to be static. The "degree of similarity" between two content frames may be a "difference" distance between the content frames. A higher difference distance between two content frames may indicate a lower degree of similarity between the two content frames. Conversely, a lower difference distance may indicate a higher degree of similarity between the content frames. If at least one of the content frames in the testing sequence is found to be substantially similar to the other content frames in the testing sequence or having degrees of similarity with the other content frames that satisfy or exceed the predetermined threshold, then none of the objects in the image displayed through the original sequence may be moving, and the original sequence may be considered to be static. Various types of distance determinations may be utilized by the indication analyzing process 704 to estimate the degree of similarity, including and without limitation, the Levenshtein distance, the Hamming distance, the Damerau-Levenshtein distance, and the longest common sequence (LCS).

To determine whether content in all of the content frames in the testing sequence are substantially the same, the static frame detector 414 may determine the differences between pixel values of corresponding pixels of a pair of content frames in the testing sequence. The static frame detector 414 may select adjacent content frames as the pair of content frames or pick a pair of contents frames that are separated by a predetermined number of content frames. The predetermined number of content frames may be one, two, three, or another quantity. For a content frame in RGB color space, each pixel in the content frame may be associated with a pixel value that comprises a vector of three numbers. The three numbers may represent the red, green, and blue components of the pixel. For the first pair of content frames in the sequence, the static frame detector 414 may determine the degree of difference by calculating the individual differences of all the corresponding pixels between the content frames in the first pair in the testing sequence and summing up the individual differences to calculate the total difference between the content frames. If this degree of difference is below a predetermined maximum difference, it may be determined that there is no change in content between the content frames in the first pair. If this degree of difference is above the predetermined maximum difference, it may be determined that there is some change in content between the content frames in the first pair. The test may be repeated for all the subsequent pairs of content frames in the testing sequence, and if all of the content frames in the testing sequence are found to be substantially the same as their pair, the original sequence may be considered to be static. If at least one of the content frames in the testing sequence is found to be substantially different from its pair, the original sequence may be considered to be not static.

As another example for determining whether content in all of the content frames in the testing sequence are substantially the same, the static frame detector 414 may compare the first pair of content frames in a testing sequence by calculating a root-mean-square difference between the pixel values of corresponding pixels of the adjacent content frames in the first pair in the testing sequence. For each corresponding pixel in the pair of content frames, the static frame detector 414 may estimate the differences between the pixel values of the corresponding pixels and square the differences. The static frame detector 414 may calculate the sum of the resulting squares of all the corresponding pixels in the pair of content frames, and estimate an average by dividing the sum of the squares by the number of corresponding pixels in the pair of content frames. The static frame detector 414 may determine the degree of difference between the content frames by calculating the square root of the average and compare the degree of difference to a predetermined threshold to assess whether the differences in content between the pair of content frames are within acceptable limits. If the degree of difference is below a predetermined threshold, it may be determined that there is no change in content between the first pair of content frames in the testing sequence. If the degree of difference is above the predetermined threshold, it may be determined that there is some change in content between the first pair of content frames in the testing sequence. The test may be repeated for all the subsequent pairs of content frames in the testing sequence, and if all of the content frames in the testing sequence are found to be substantially the same as their pair, the original sequence may be considered to be static. If at least one of the content frames in the testing sequence is found to be substantially different from its pair, the original sequence may be considered to be not static.

As another example of determining whether content in all of the content frames in the testing sequence are substantially the same, the static frame detector 414 may determine that at least a portion of content frames in a testing sequence of content frames are static by partitioning the content frames in the testing sequence into corresponding blocks. The blocks may be rows of pixels, columns of pixels, squares, or any type of polygon. Partitioning the content frames into blocks may reduce the amount of time and processing resources required to detect if content frames in the testing sequence are fully static. Partitioning the content frames into blocks may also enable the static frame detector 414 to determine if only a portion or certain portions of the content frames in the sequence are static. A portion of content frames in the original sequence may be static if content in the corresponding blocks in that portion of the content frames in the testing sequence is substantially the same.

For the block partitioning method, the static frame detector 414 may compare corresponding blocks in pairs of content frames in the testing sequence to determine the differences between the corresponding blocks. The differences between corresponding blocks may be determined by determining the differences between the pixel values of corresponding pixels in the corresponding blocks. For a pair of corresponding blocks in the testing sequence, the static frame detector 414 may determine the degree of difference by calculating the individual differences of all the corresponding pixels between the corresponding blocks and summing up the individual differences to calculate the total difference between the corresponding blocks. If the degree of difference is below a predetermined maximum difference, it may be determined that there is no change in content between the corresponding blocks in the pair of content frames. If the degree of difference is above the predetermined maximum difference, it may be determined that there is some change in content between the corresponding blocks in the pair of content frames. The test may be repeated for all the corresponding blocks in the subsequent pairs of content frames in the testing sequence, and if all of the corresponding blocks are found to be substantially the same, the corresponding blocks may be considered to be static or static in the original sequence of content frames. If at least one of the corresponding blocks is found to be substantially different, the corresponding blocks may be considered to not be static or static in the original sequence of content frames.

As another example for determining whether the content in all of the content frames in the testing sequence are substantially the same, the static frame detector 414 may generate perceptual hashes (pHashes) of the content frames in the testing sequence and compare the pHashes to identify similar contents in the content frames in the testing sequence. A perceptual hashing algorithm or function may be applied to the content frames in the testing sequence for generating a pHash as a fingerprint or signature for the content frames. The fingerprint or the signature of the content frames may be a string or sequence. Two content frames that are visually similar in content may have perceptual hashes that are similar, while two content frames that are visually much different will have perceptual hashes that are less similar.

An example perceptual hashing algorithm that can be used by the static frame detector 414 may be an average hash function that uses Discrete Cosine Transform (DCT) to generate the pHash. The static frame detector 414 may compress a content frame to a 32×32 pixels image. The static frame detector 414 may compute the DCT of the 32×32 pixels image, which results in a 32×32 collection of frequency scalars. The static frame detector 414 may take the top left 8×8 scalars that represent the lowest frequencies in the picture and determine the mean average of 8×8 scalars. The static frame detector 414 may generate a 64-bit pHash value where each bit is set to 0 or 1 depending on whether each of the 8×8 or 64 scalars is above or below the mean value. The static frame detector 414 may determine the degree of difference between two content frames by comparing pHashes for the frames. The static frame detector 414 may determine a "distance" between the perceptual hashes where the distance is a measure of the difference between two pHashes. Various types of distance determinations may be utilized by the static frame detector 414, including and without limitation, the Levenshtein distance, the Hamming distance, the Damerau-Levenshtein distance, and the longest common sequence (LCS).

Referring back to FIG. 4, based on determining a sequence of partial or fully static content frames in the video data stream 418, the static frame detector 414 may generate an indication 416 for the sequence of partial or fully static content frames. The static frame detector 414 may generate the indication 416 by hashing one of the static content frames in the sequence. In other words, an indication 416 may comprise, for example, a hash of the pixel values of all the pixels in the static content frame. The static frame detector 414 may generate the indication 416 by generating a pHash for the static content frame. The indication 416 may include a quick response (QR) code and/or other identifiers for the computing device 202 generating the indication 416. The indication 416 may include additional information, such as a timestamp, a program title of the content item being outputted by the computing device 202, descriptive information for the content item, a name of the service or application via which the content item is received by the computing device 202, etc. The static frame detector 414 may send the generated indication 416 to a quality control server.

Figures 5A, 5B, 5C:
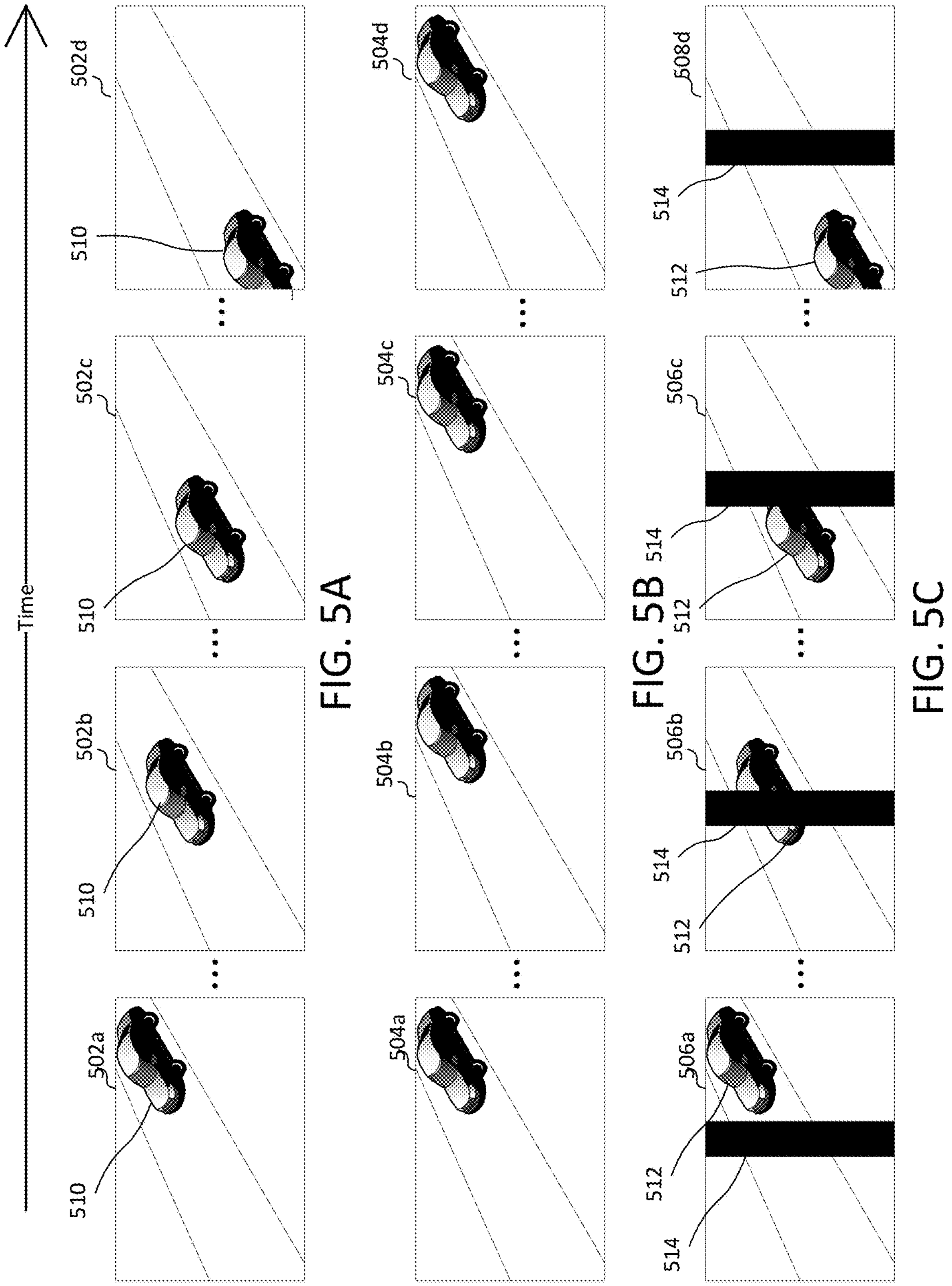
FIGS. 5A, 5B, and 5C show example sequences of static content frames.

FIG. 5A shows an example selection of content frames 502*a*, 502*b*, 502*c*, and 502*d* at intervals from a sequence. A static frame detector may determine that the content frames 502*a*, 502*b*, 502*c*, and 502*d* in the sequence are not static, as the content frames comprise at least one moving object, such as the car 510. In the sequence of content frames 502*a*, 502*b*, 502*c*, and 502*d*, the car 510 is moving from the upper right corners of the content frames to the lower left corners. If the static frame detector compares the corresponding pixels and/or pHashes of the content frames 502*a*, 502*b*, 502*c*, and 502*d*, the static frame detector may find substantial differences between the corresponding pixels in the content frames 502*a*, 502*b*, 502*c*, and 502*d*.

FIG. 5B shows an example selection of static content frames 504*a*, 504*b*, 504*c*, and 504*d* at intervals from a sequence. A static frame detector may determine that the content frames 504*a*, 504*b*, 504*c*, and 504*d* in the sequence are fully static, as the content frames do not comprise a moving object. If the static frame detector compares the corresponding pixels and/or pHashes of the content frames 504*a*, 504*b*, 504*c*, and 504*d*, the static frame detector may not find substantial differences between the corresponding pixels and/or pHashes of the content frames 502*a*, 502*b*, 502*c*, and 502*d*. The static sequence of content frames 504*a*, 504*b*, 504*c*, and 504*d* may be caused by the degraded performance of the computing device (e.g., an STB) outputting the sequence.

FIG. 5C shows an example selection of partially static content frames 506*a*, 506*b*, 506*c*, and 506*d* at intervals from a sequence. A static frame detector may determine that the content frames 506*a*, 506*b*, 506*c*, and 506*d* in the sequence are partially or substantially static as a portion 514 of the content frames do not comprise a moving object. The other portion of the content frames may comprise a moving object, such as the car 512. If the static frame detector compares the corresponding pixels in the portion 514 in the content frames 506*a*, 506*b*, 506*c*, and 506*d* or a portion of the pHashes for the content frames that correspond to the portion 514, the static frame detector may determine that differences between the corresponding pixels or portions of the pHashes are substantial. The partially static portion in the sequence of content frames 504*a*, 504*b*, 504*c* and 504*d* may be caused by the degraded performance of the computing device (e.g., an STB) outputting the sequence.

Figure 6A:
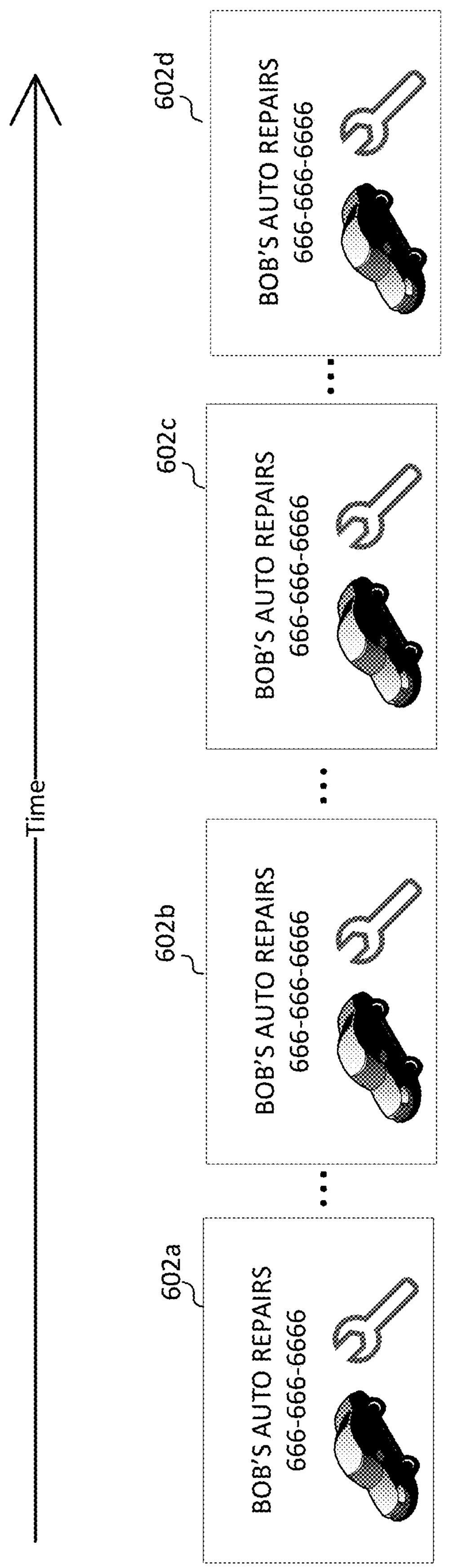
FIGS. 6A and 6B respectively show an example still advertisement and an example emergency alert.
Figure 6B:
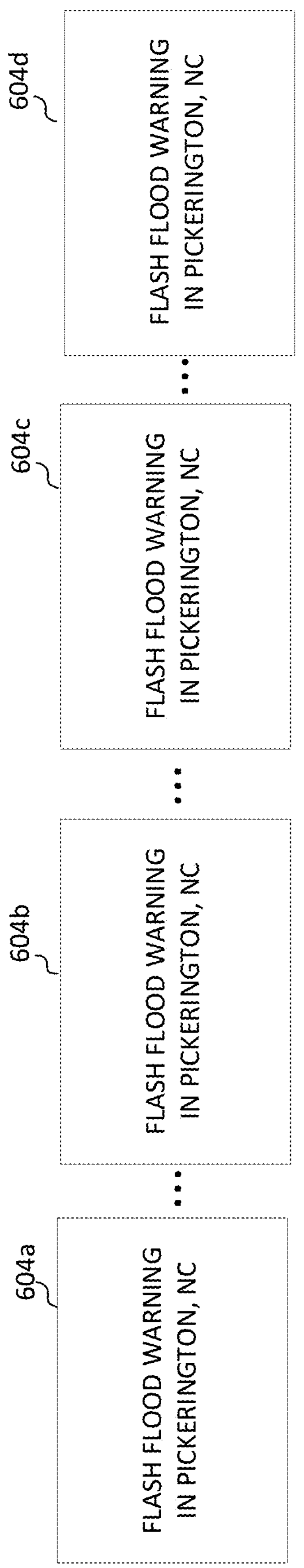

Computing devices (e.g., STBs) may cause an output of static content frames in which the absence of moving objects is intentional. Examples of such intentionally static content may include still or banner advertisements, emergency alerts, freeze-frames in an action replay during the transmission of a sporting event, "splash" or other notice screens (e.g., indicating loading or update of software in the computing devices), etc. FIG. 6A shows an example sequence of intentionally static content frames 602*a*, 602*b*, 602*c*, and 602*d* for a video advertisement. Video advertisements may comprise sequences of static content frames at any portion of the advertisements to convey important information, such as contact information, logo, website, or address of the business that is being advertised in the video advertisement. A static frame detector may determine that the content frames 602*a*, 602*b*, 602*c*, and 602*d* in the sequence are fully static, as the content frames do not comprise a moving object. Similarly, emergency alerts may comprise sequences of static content frames, such as the example sequence of content frames 604*a*, 604*b*, 604*c*, and 604*d* illustrated in FIG. 6B, to convey important information regarding the emergency.

Figure 7A:
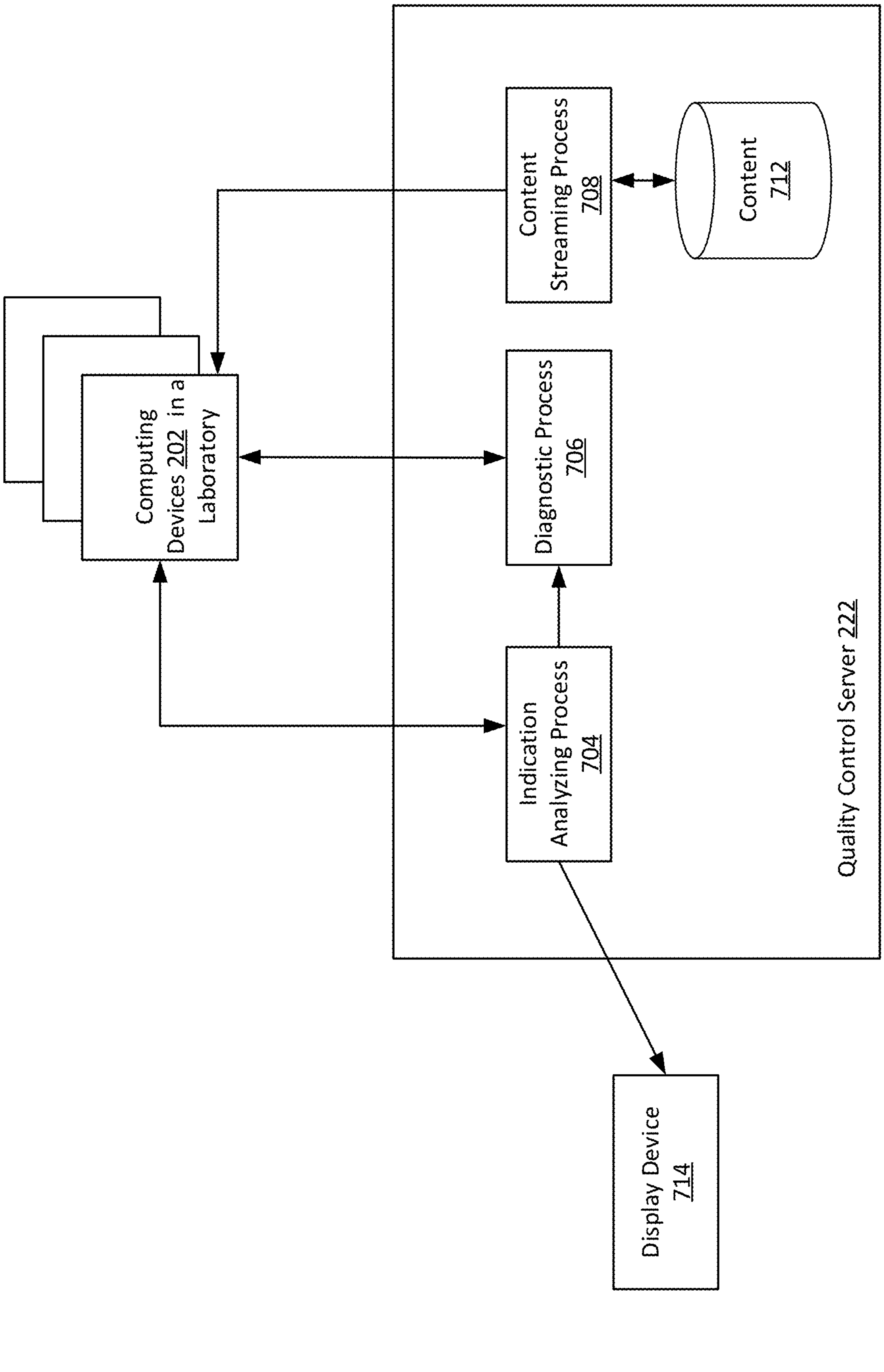
FIGS. 7A and 7B are block diagrams showing examples of quality control servers.

FIG. 7A is a block diagram showing additional details of the example quality control server 222 in FIG. 2. The quality control server 222 may comprise one or more computing device(s) such as the computing device 300. The quality control server 222 may be variously configured and include software components such as an indication analyzing process 704, a diagnostic process 708, and/or a content streaming process 708. The quality control server 222 may also include a content database 712. A database may comprise two or more separate databases, and when considered together, still constitute a "database" as that term is used herein and a database distributed across a cloud or the Internet may still be a "database."

The content streaming process 708 may select a content item from the content database 712 and multicast or unicast the selected content to computing devices in a laboratory setting. For example, the same content item may be streamed to all the computing devices 202 in the laboratory setting in FIG. 2. The content streaming process may send additional information regarding the selected content item to the computing devices 202. The additional information may comprise a program title of the selected content item and/or descriptive information for the selected content item.

The indication analyzing process 704 may receive the indications from the computing devices 202 being tested in the laboratory. The indication analyzing process 704 may also monitor the content frames outputted by the computing devices 202 to detect static content frames (e.g., using one of the methods described in connection with FIG. 4).

If the same content is being sent to all the computing devices 202, the computing devices with adequate performance may display similar content frames simultaneously. If a portion of the selected content item for the computing devices 202 being tested in the laboratory setting includes no moving objects, computing devices with adequate performance may display a sequence of static content frames at the same time. Malfunctioning computing devices may output different content frames. If a portion of the selected content item for the computing devices 202 being tested in the laboratory setting includes moving objects, the computing devices with adequate performance may display a sequence of content frames that are not static, and malfunctioning computing devices may output partially or fully frozen content frames.

The indications may comprise hashes or pHashes of partial or whole static content frames outputted by the computing devices 202. The indications may comprise additional information regarding the content item being outputted by the computing devices. The indication analyzing process 704 may analyze the received indications from the computing devices 202 to identify malfunctioning computing devices.

Figure 7B:
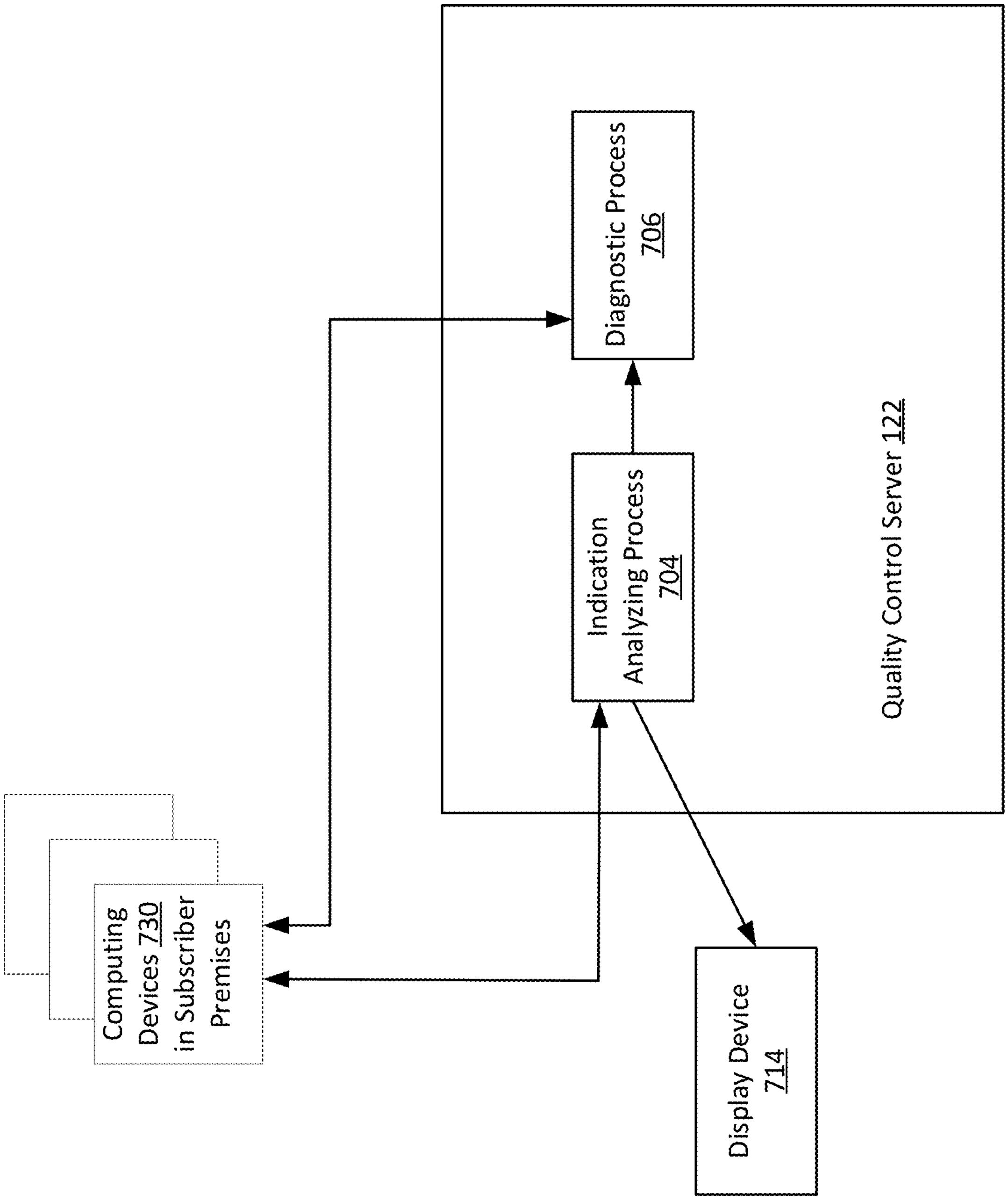

FIG. 7B is a block diagram showing additional details of the example quality control server 122 in FIGS. 1A and 1B that may receive data, such as indications, from computing devices 730 deployed in subscribers' premises (e.g., the premises 102 in FIG. 1). The quality control server 122 may comprise one or more computing device(s) such as the computing device 300. Similar to the quality control server in FIG. 7A, the quality control server 122 in FIG. 7B may be variously configured and include software components such as an indication analyzing process 704, and a diagnostic process 708.

The indication analyzing process 704 may receive the indications from the computing devices 730 deployed in subscribers' premises. The indication analyzing process 704 may also monitor the content frames outputted by the computing devices 730 deployed in subscribers' premises to detect static content frames (e.g., using one of the methods described in connection with FIG. 4) and generate indications associated with the static content frames. The computing devices 730 deployed in subscribers' premises may be outputting content frames for multiple content items. Computing devices with adequate performance and outputting content frames for the same content item may display similar content frames simultaneously. For computing devices outputting content frames for the same content item, if a portion of the content item includes no moving objects, the computing devices with adequate performance may display a sequence of static content frames at the same time. Malfunctioning computing devices may output different content frames. For computing devices outputting content frames for the same content item, if a portion of the content includes moving objects, the computing devices with adequate performance may display a sequence of content frames that are not static, and malfunctioning computing devices may output partially or fully frozen content frames. The received indications may comprise hashes or pHashes of partial or whole frozen content frames outputted by the computing devices 703. The indications may comprise additional information regarding the content item being outputted by the computing devices.

Figure 8:
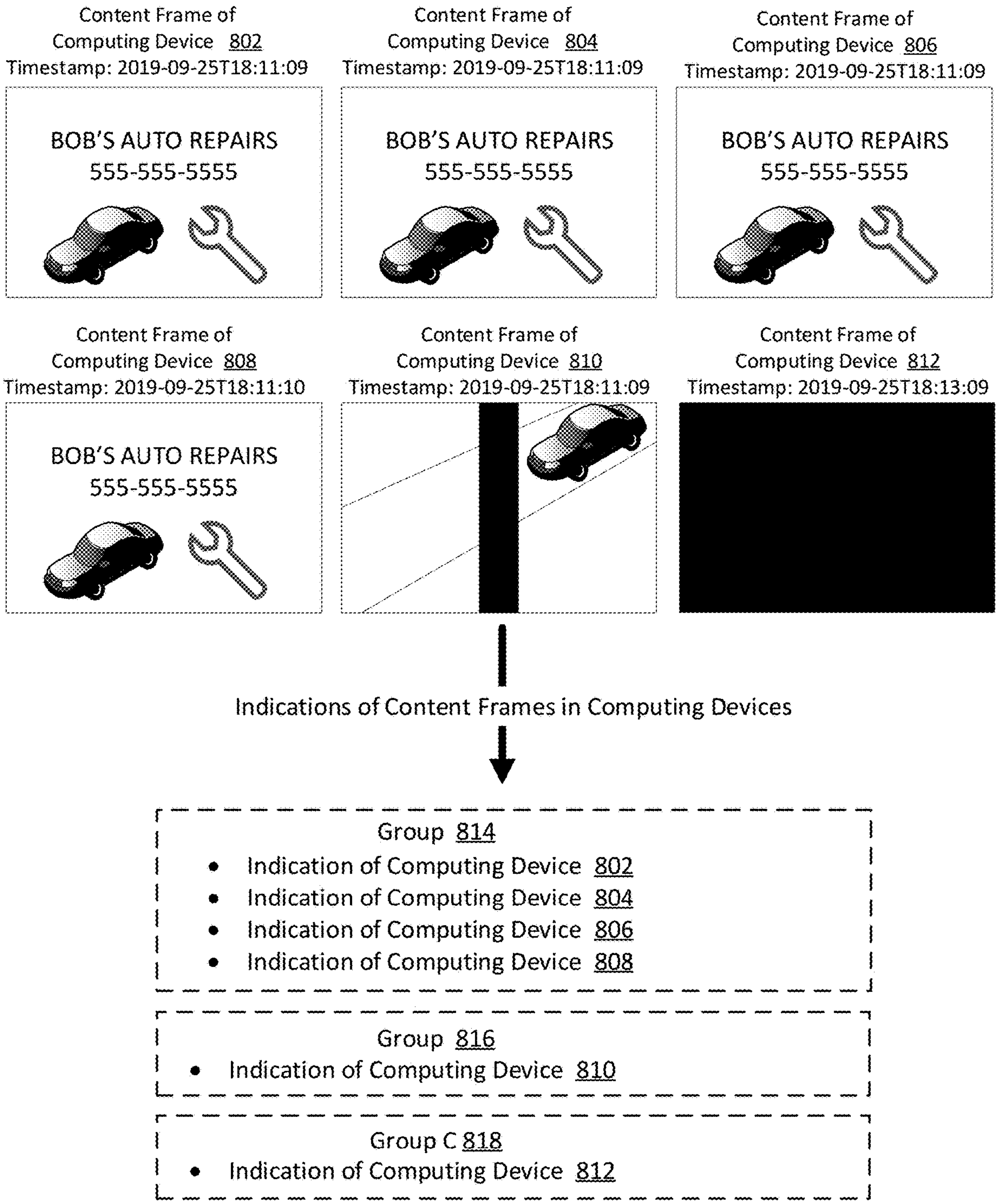
FIG. 8 shows an example of groups of indications.

FIG. 8 shows an example of groups of indications. The indication analyzing process 704 may receive indications of content frames from a computing device 802, a computing device 804, a computing device 806, a computing device 808, a computing device 810, and a computing device 812. The computing devices 802, 804, 806, 808, 810, and 812 may be computing devices similar to the computing devices 202 being tested in a laboratory. Each one of the indications may be associated with a timestamp that indicates the day and time the content frame was outputted by the corresponding computing device. The indication analyzing process 704 may analyze the received indications from the computing devices 802, 804, 806, 808, 810, and 812 to identify one or more malfunctioning computing devices and/or computing devices with degraded performance.

The indication analyzing process 704 may use machine learning-based models to compare the indications and group similar indications. Examples of machine learning-based models include a Bayesian machine learning algorithm, regression-based models, neural network-based models, and/or fully-connected network-based models. The indication analyzing process 704 may determine a "degree of similarity" between two indications by estimating a "difference" distance between the indications. Various types of distance determinations may be utilized by the indication analyzing process 704 to estimate the degree of similarity, including and without limitation, the Levenshtein distance, the Hamming distance, the Damerau-Levenshtein distance, and the longest common sequence (LCS). The higher the difference distance between two indications, the lower the degree of similarity between the two indications. Conversely, a lower difference distance may indicate a higher degree of similarity between the indications.

The indication analyzing process 704 may determine degrees of similarity among the indications to form one or more groups of indications. Indications in each group may have degrees of similarity among each other that is higher than a predetermined similarity threshold. Indications from two different groups may have a degree of similarity that is lower than the predetermined similarity threshold.

For example, the indications for the computing device 802, the computing device 804, the computing device 806, and the computing device 808 may have high degrees of similarity that are above the predetermined similarity threshold, as the corresponding content frames comprise similar content. Therefore, indications for the computing device 802, the computing device 804, the computing device 806, and the computing device 808 may be assigned to group 814. The indications for the computing device 810 and the computing device 812 may have low degrees of similarity to the indications of the computing devices in group 814, as the content frames of being output by the computing device 810 and the computing device 812 do not show the same content as the content frames of the computing devices in group 814. Therefore, the indications of the computing device 810 and the computing device 812 may be assigned to groups other than group 814, such as the group 816 and the group 818.

In connection with comparing the degrees of similarity in the indications, the indication analyzing process 704 may also take the timestamps of the indications into account. For example, the indications with timestamps within a predetermined time range may be assigned to one group. For example, the predetermined time range may be five seconds. Therefore, the maximum time difference between two timestamps in a group with the predetermined time range of five seconds may be five seconds. For example, the indications of the computing devices in group 814 are associated with similar timestamps. The indications of the computing device 810 and the computing device 812 may be assigned to different groups as the difference between their timestamps is greater than five seconds.

Referring back to FIGS. 7A and 7B, the indication analyzing process 704 may determine that the group with the highest number of computing devices, such as group 814 in FIG. 8, contains indications for computing devices with adequate performance. The indication analyzing process 704 may also determine that if a quantity of computing devices in a group exceeds a predetermined threshold, the computing devices in that group have adequate performance. For example, a thousand computing devices may be tested by streaming a content item, and eight hundred computing devices may detect static content frames. The eight hundred computing device may generate indications associated with the static content frames and send the indications to the indication analyzing process 704. In order to determine whether the eight hundred computing devices have degraded performance or are malfunctioning, the indication analyzing process 704 may determine whether the received indications are false positive or positive. If the indications are determined to be positive (e.g., the computing devices are malfunctioning and/or have degraded performance), diagnostic testing may be scheduled for those computing devices. However, if the static content frames associated with the received indications are associated with an intentionally static content, the indication analyzing process 704 may determine the indications to be false positive. As the majority of the thousand computing devices are being tested by receiving the same content item and report similar indications, the static content frames may be associated with an intentionally static content, and the indications may be determined to be false positive. The intentionally static content may be still or banner advertisements, emergency alerts, splash screens, or scenes in the content item that are intentionally unchanging for an extended period.

The indication analyzing process 704 may send a signal to the computing devices in the group with adequate performance, indicating that the static content frames were caused by static content streamed to the computing devices, and the indications are false positives. Based on the signals received from the indication analyzing process 704, the computing devices with adequate performances may continue with their normal operation and may determine not to perform any diagnostic testing.

Referring back to FIG. 8, the indication analyzing process 704 may determine that groups other than the group with computing devices with adequate performance, such as group 816 and the group 818, comprise indications for computing devices with degraded performance. The indication analyzing process 704 may send a signal to the computing devices with degraded performance to perform diagnostic testing routines or indicating that the indications are positive. Based on the signals received from the indication analyzing process 704, the computing devices with degraded performance may perform diagnostic testing routines to determine the cause of the degraded performance or generate a message requesting that a technician investigate the cause of the degraded performance. Also, or alternatively, the diagnostic process 706 in the quality control server 222 may initiate the performance of diagnostic testing routines in the computing devices with degraded performance.

The indication analyzing process 704 may display information regarding the computing devices with degraded performance via the display device 714. Also, or additionally, the indication analyzing process 704 may display information regarding the computing devices with adequate performance via the display device 714.

Similarly, the indication analyzing process 704 in FIG. 7B may receive indications from the computing devices 730 in subscribers' premises. Various content items may be sent to the computing devices 730 for display, and therefore, the computing devices with adequate performance and outputting the same content item may display similar content frames simultaneously. The indication analyzing process 704 may compare the indications to form one or more groups of indications with degrees of similarity higher than a predetermined similarity threshold. The indication analyzing process 704 may form groups of indications in such a way that the indications in a particular group with a high degree of similarities are associated with the same content item. Furthermore, the indication analyzing process 704 may also take the timestamps of the indications into account by determining that the timestamps are within a predetermined time range. The indication analyzing process 704 may determine that among the groups associated with the same content item, the group satisfying a predetermined threshold includes computing devices with adequate performance. The indication analyzing process 704 may send a signal to the computing devices with adequate performance, indicating that the indications received from the computing devices are false positives. Based on the signals from the indication analyzing process 704, the computing devices with adequate performances may continue with their normal operation and determine not to perform any diagnostic testing. The indication analyzing process 704 may determine that groups other than the group with computing devices with adequate performance comprise computing devices with degraded performance. The indication analyzing process 704 may send a signal to the computing devices with degraded performance to perform diagnostic testing routines. Alternatively, the diagnostic process 706 in the quality control server 222 may initiate diagnostic testing routines of the computing devices with degraded performance.

Figure 9:
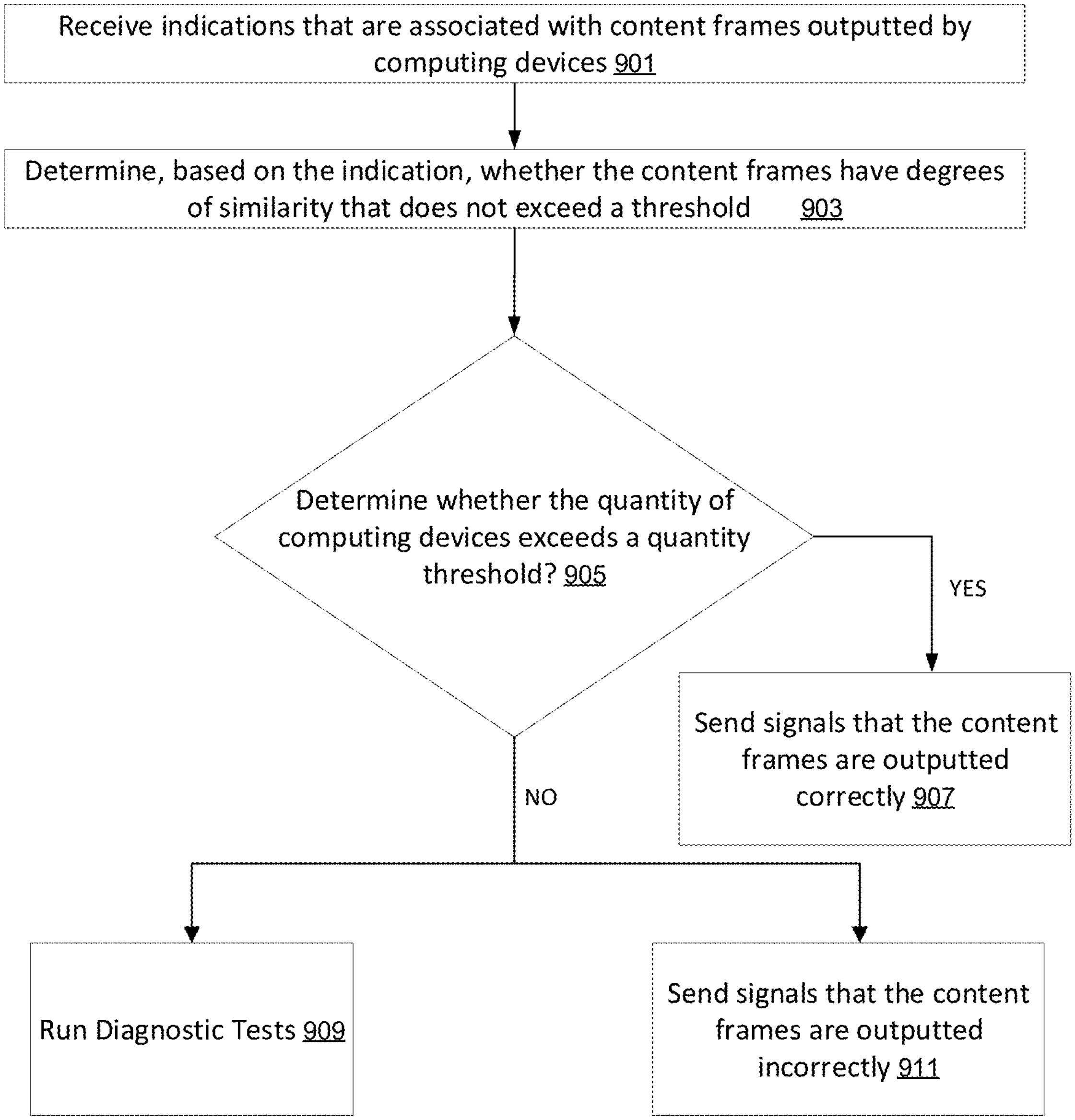
FIG. 9 is a flow chart showing an example method for identifying malfunctioning computing devices.

FIG. 9 is a flow chart showing an example method for determining computing devices with degraded performance by a quality control server, such as the quality control server 222 in FIG. 2 or the quality control server 122 in FIG. 1. One, some, or all steps of the method may also or alternatively be performed by one or more other computing devices. One, some, or all of the steps may be rearranged or otherwise modified. Steps may be omitted and/or other steps added.

At step 901, the quality control server may receive data, such as indications, from computing devices. The computing devices may be computing devices being tested in a laboratory setting and/or computing devices deployed in subscribers' premises. If the same content item is being sent to all the computing devices, the computing devices with adequate performance may display similar content frames simultaneously. If a portion of the content item includes no moving objects, most of the computing devices with adequate performance may display a sequence of intentionally static content frames at the same time. Malfunctioning computing devices may output different content frames. The computing devices may generate indications based on the static content frames and send the indications to the quality control server. The indications may comprise hashes or pHashes of the static content frames outputted by the computing devices. The indications may comprise additional information regarding the content item being outputted by the computing devices.

At step 903, the quality control server may analyze the received indications to determine that the content frames associated with the indications have degrees of similarities that exceed a predetermined similarity threshold. The quality control server may determine the degrees of similarities by identifying patterns in the hashes of the indications and identify a repeating pattern in the hashes. The quality control server may use machine learning-based models to determine the degrees of similarities. Examples of machine learning-based models include Bayesian machine learning models, regression-based models, neural network-based models, and/or fully-connected network-based models. The quality control server may also compare the timestamps of the indications to identify the common content frame that was outputted by the computing devices at approximately the same time or within a predetermined time range.

At step 905, the quality control server may determine if a quantity of the computing devices exceeds a predetermined quantity threshold. For example, for a laboratory setting testing 1000 computing devices, the predetermined quantity threshold may be 700, 800, or 900. In another example, for 100,000 computing devices at users' premises that are tuned to a certain channel (or live content), the predetermined quantity threshold may be 95,000. If the quantity exceeds the predetermined quantity threshold, the quality control server may send signals to the computing devices and/or to a remote server, indicating that the content frames were outputted correctly or the performances of the computing devices are adequate at step 907.

If the quantity does not exceed the predetermined quantity threshold, at step 909, the quality control server may take steps to diagnose the cause of, and/or improve the degraded performance of the computing device. Alternately or in conjunction with step 909, the quality control server may send a signal to the computing devices and/or a server that the content frames were outputted incorrectly at step 911. The quality control server may also send a signal to the diagnostic process in the computing device (e.g., the diagnostic process 420 in FIG. 4) to start performing diagnostic testing routines at step 909. Alternately, the quality control server may send instructions and/or code to the computing device for diagnostic testing routines. Diagnostic testing routines may be performed by the diagnostic process in the computing device or the instructions sent by the quality control server to identify the cause of the degraded performance of the computing device. The cause of the degraded performance may be a failure in a hardware component of the computing device, corruption of a software module in the computing device, a wiring fault, improper configuration of the computing device, network operating conditions, video decoding buffer overflow, etc. The quality control server may use the results of the diagnostic tests in an attempt to fix or repair the problem of the degraded performance or send a failed test message to a quality control server.

The quality control server may perform diagnostic testing routines related to the hardware components of the computing device, such as the amount of processor utilization, the amount of available memory, etc. If the amount of processor utilization or available memory is below a threshold, the quality control server may send a signal to the computing device to restart its system. If the quality control detects an overflow in the video decoding buffer in the computing device, the quality control server may send a request to the computing device to increase the size of its buffer. If the quality control server detects an improper configuration of the computing device, the quality control server may attempt to reconfigure the computing device. If a software module of the computing device is corrupted, the quality control server may attempt to reinstall that module. The quality control server may measure parameters associated with current network conditions such as bandwidth utilization, bitrate, a recent change in bandwidths, jitter, latency, retransmissions, and packet loss with the received digital signals or the received content item. Based on the measured parameters, the quality control may request the content server in FIG. 1 to send content items to the computing device at a bitrate different from the current bitrate (e.g., the current bitrate capability of the computing device), or send a different version of the content item, such as a different resolution, codec, streaming format, content format (e.g., screen size, file type, and the like).

Figure 10:
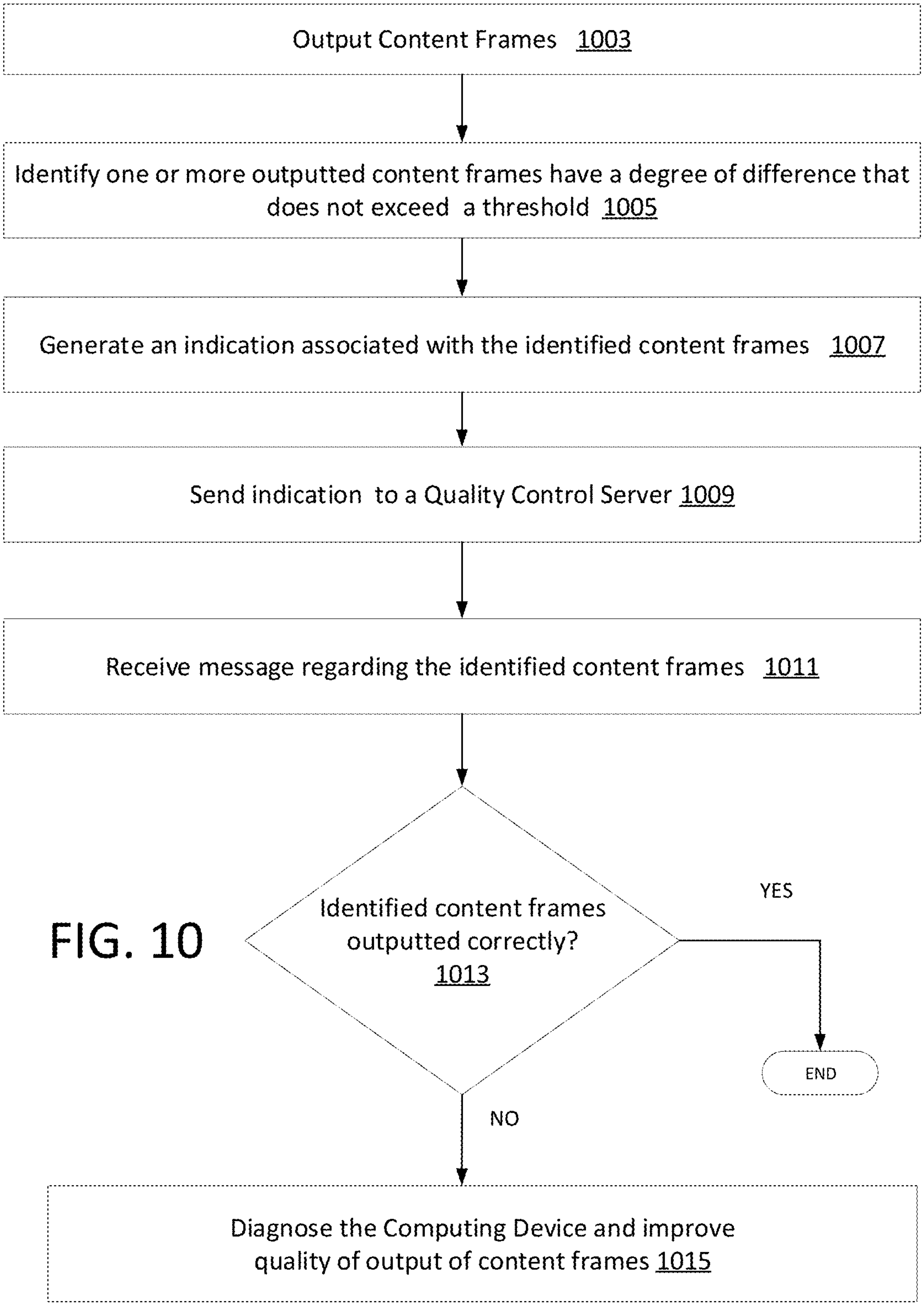
FIG. 10 is a flow chart showing an example method for identifying static content frames in computing devices.

FIG. 10 is a flow chart showing an example method for identifying static content frames by a computing device. The computing device may be tested in a laboratory setting or while the computing device is deployed, e.g., at a subscriber's premises. One, some, or all steps of the method may also or alternatively be performed by one or more other computing devices. One, some, or all of the steps may be rearranged or otherwise modified. Steps may be omitted and/or other steps added.

At step 1003, the computing device may decode a signal to generate a plurality of content frames and output the plurality of content frames to a display device (e.g., a television). The signal may be a stream of compressed data for a content item. The compressed data may be compressed under an MPEG (Motion Pictures Experts Group) standard, such as MPEG-2 or MPEG-4. The computing device may decompress the signal to generate the plurality of content frames. The signal may also comprise additional information for the content item, such as a program title of the content item, descriptive information for the content item, a name for the service via which the content item is received by the computing device, an application sending the content item, etc.

At step 1005, the computing device may detect a sequence of content frames that are partially or fully static or have degrees of difference that does not exceed a predetermined threshold. The computing device may analyze the sequence of content frames and determine, e.g., using one or more of the methods described above, if the sequence can be considered to be static. The computing device may determine that the degrees of differences by determining the difference between corresponding pixels of the content frames in the sequence and/or the RMS difference between pairs of adjacent content frames in the sequence. The computing device may also or alternatively partition the content frames into different blocks and determine the differences between corresponding blocks in the content frames in a sequence.

After the computing device determines that the degrees of differences between content frames do not exceed a predetermined threshold, the computing device may generate an indication for one of the content frames in the sequence at step 1007. The computing device may generate the indication by hashing the selected content frame in the sequence, for example, by generating a pHash of the content frame. The indication may comprise a QR code and/or other identifiers of the content item and/or the computing device. The indication may also or alternatively comprise one or more types of additional information such as a timestamp, a program title of the content, descriptive information for the content item, the service via which the content item is received by the computing device, an application sending the content item, etc.

At step 1009, the computing device may send the generated indication to a quality control server. The computing device may send more than one indication for a sequence of partially or fully frozen content frames. At step 1011, the computing device may receive a message from the quality control server regarding the indication sent at step 1009.

At step 1013, the computing device may determine whether the message received at step 1011 indicates that the computing devices outputted the sequence of content frames in step 1005 correctly or incorrectly. The computing device may receive a "positive" message indicating the sequence of content frames were outputted incorrectly. Alternatively, the computing device may receive a "false positive" message indicating that the sequence of content frames was outputted correctly. If the message indicates that the sequence of content frames was outputted correctly, the computing device may take no further action.

If the message indicates that the sequence of content frames was outputted incorrectly, the computing device may take steps to improve its degraded performance at step 1015. The computing device server may take steps to diagnose the cause of, and/or improve the degraded performance of the computing device.

Diagnostic testing routines may be performed by the diagnostic process (e.g., the diagnostic process 420) in the computing device. The cause of the degraded performance may be a failure in a hardware component of the computing device, corruption of a software module in the computing device, a wiring fault, improper configuration of the computing device, network operating conditions, video decoding buffer overflow, etc. The quality control server may use the results of the diagnostic tests in an attempt to fix or repair the problem causing the degraded performance or send a failed test message to a quality control server.

The computing device may perform diagnostic testing routines to identify the cause of the degraded performance. The cause of the degraded performance may be a failure in hardware component of the computing device, corruption of a software module in the computing device, a wiring fault, improper configuration of the computing device, network operating conditions, video decoding buffer overflow, etc. The computing device may use the results of the diagnostic tests in an attempt to fix or repair the problem causing the degraded performance or send a failed test message to a quality control server.

The computing device may run diagnostic tests related to the hardware components of the computing device, such as the amount of processor utilization, the amount of available memory, etc. If the amount of processor utilization or available memory is below a threshold, the computing device may restart its system. If the computing device detects an overflow in the video decoding buffer, the computing device may increase the size of the buffer. If the computing device detects an improper configuration of the computing device, the computing device may attempt to reconfigure. If a software module of the computing device is corrupted, the computing device may reinstall that module. The computing device may measure parameters associated with current network conditions such as bandwidth utilization, bitrate, a recent change in bandwidths, jitter, latency, retransmissions, and packet loss with the received digital signals or the received content item. The computing device may report the measured parameters to the quality control server. The computing device may send a message to the content server in FIG. 1 to send a content item at a bitrate different from the current bitrate (e.g., the current bitrate capability of the computing device). The computing device may request a different version of the content item, such as a different resolution, codec, streaming format, and content format (e.g., screen size, file type, and the like).

Figure 11:
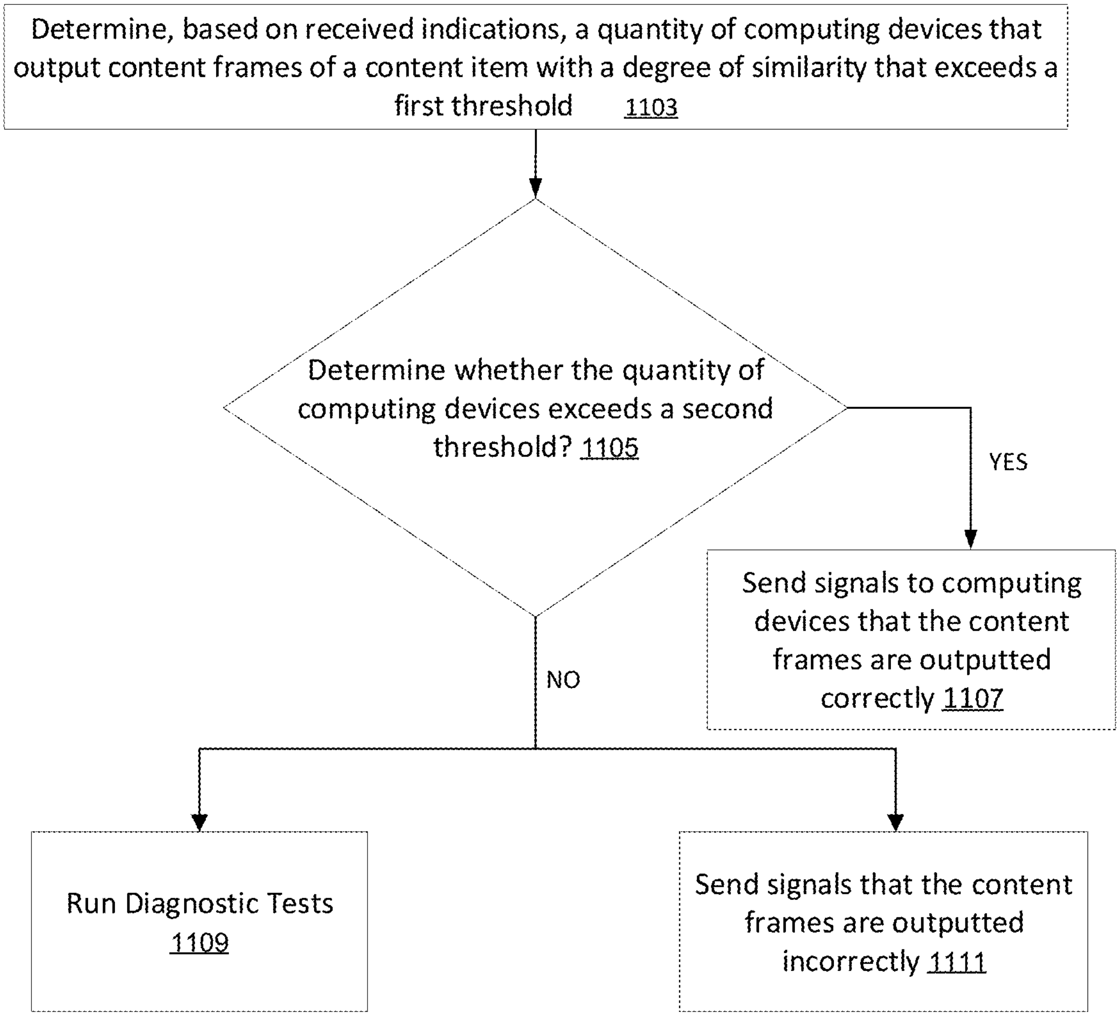
FIGS. 11 and 12 are flow charts showing example methods for identifying correct outputting of content frames by computing devices.

FIG. 11 is a flow chart showing an example method for determining (e.g., by a quality control server, such as the quality control server 222 in FIG. 2 or the quality control server 122 in FIG. 1) whether computing devices are correctly outputting content frames. One, some, or all steps of the method may also or alternatively be performed by one or more other computing devices. One, some, or all of the steps may be rearranged or otherwise modified. Steps may be omitted and/or other steps added.

At step 1103, the quality control server may determine that a quantity of computing devices are outputting static content frames or content frames with a degree of similarity that exceeds a first threshold. The content frames may be associated with the same content item. The computing devices may comprise computing devices being tested in a laboratory setting and/or computing devices deployed in subscribers' premises.

The quality control server may determine that the computing devices are outputting static content frames based indications received from each of the computing devices. Each of the computing devices in the quantity of computing devices may generate an indication based on the outputted static content frames and send an indication to the quality control server. The indications may comprise hashes or pHashes of the static content frames outputted by the computing devices. The indications may comprise additional information regarding the content item being outputted by the computing devices.

At step 1105, the quality control server may determine if the quantity of the computing devices at step 1103 exceeds a predetermined quantity threshold. If the quantity exceeds the predetermined quantity threshold, the quality control server may send signals to the computing devices and/or a remote server, indicating that the computing devices are outputting the static content frames correctly at step 1107.

If the quantity does not exceed the predetermined quantity threshold, at step 1109, the quality control server may take steps to diagnose the cause of, and/or improve the degraded performance of the computing device(s). Alternately or in conjunction with step 1109, the quality control server may send a signal to the computing devices and/or a server that the content frames were outputted incorrectly at step 1111. The quality control server may also send a signal to a diagnostic process in the computing devices (e.g., the diagnostic process 420 in FIG. 4) to start performing diagnostic testing routines at step 1109. Alternately, the quality control server may send instructions and/or code to the computing device for diagnostic testing routines. Diagnostic testing routines may be performed by the diagnostic process in the computing device based on the instructions sent by the quality control server to identify the cause of the degraded performance of the computing device. The cause of the degraded performance may be a failure in a hardware component of the computing device, corruption of a software module in the computing device, a wiring fault, improper configuration of the computing device, network operating conditions, video decoding buffer overflow, etc. The quality control server may use the results of the diagnostic tests in an attempt to fix or repair the problem of the degraded performance or send a failed test message to a quality control server.

Figure 12:
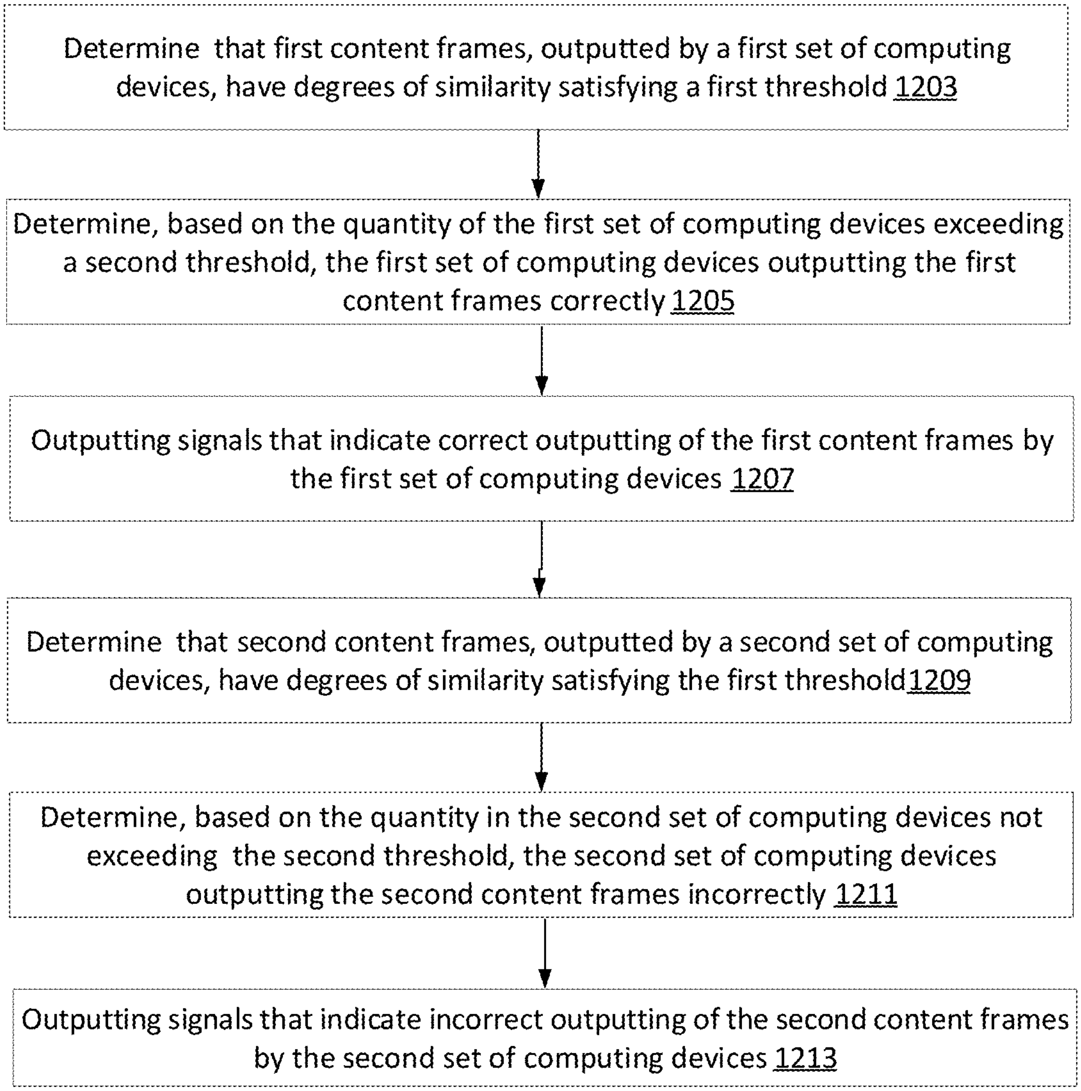

FIG. 12 is a flow chart showing an example method for determining (e.g., by a quality control server, such as the quality control server 222 in FIG. 2 or the quality control server 122 in FIG. 1) whether sets of computing devices are correctly outputting content frames. One, some, or all steps of the method may also or alternatively be performed by one or more other computing devices. One, some, or all of the steps may be rearranged or otherwise modified. Steps may be omitted and/or other steps added.

At step 1203, the quality control server may determine that a first set of computing devices are outputting first content frames that are static or with a degree of similarity that exceeds a first threshold. The first content frames may be associated with the same content item. The first set of computing devices may comprise computing devices being tested in a laboratory setting and/or computing devices deployed in subscribers' premises.

The quality control server may determine that the first set of computing devices are outputting static first content frames based indications received from each computing device in the first set of computing devices. Each of the computing devices in the first set may generate an indication based on the outputted static first content frames and send the indication to the quality control server. The indications may comprise hashes or pHashes of the static first content frames outputted by the computing devices. The indications may comprise additional information regarding the content item being outputted by the computing devices.

At step 1205, the quality control server may determine that the quantity of computing devices in the first set at step 1203 exceeds a predetermined quantity threshold. The quality control server may send signals to the first computing devices and/or a remote server indicating that the first set of computing devices are outputting the first content frames correctly at step 1207.

At step 1209, the quality control server may determine that a second set of computing devices are outputting second content frames that are static or with a degree of similarity that exceeds the first threshold. The second content frames may be associated with the same content item. The second set of computing devices may comprise computing devices being tested in a laboratory setting and/or computing devices deployed in subscribers' premises.

The quality control server may determine that the second set of computing devices are outputting static second content frames based indications received from each computing device in the second set of computing devices. Each of the computing devices in the second set may generate an indication based on the outputted static second content frames and send the indication to the quality control server. The indications may comprise hashes or pHashes of the static first content frames outputted by the computing devices. The indications may comprise additional information regarding the content item being outputted by the computing devices in the second set.

At step 1211, the quality control server may determine that the quantity of computing devices in the second set does not exceed the predetermined quantity threshold. The quality control server may send signals to the second computing devices and/or a remote server indicating that the second set of computing devices are outputting the second content frames incorrectly at step 1213.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, from a plurality of computing devices, one or more first signals indicating that the plurality of computing devices each outputted a plurality of content frames that are at least partially static; and outputting, based on a determination of a threshold being satisfied by the plurality of computing devices that outputted the plurality of content frames that are at least partially static, one or more second signals that indicate the plurality of content frames were correctly outputted by the plurality of computing devices.

2. The method of claim 1, further comprising determining, based on a distance value being below a predetermined value, that the plurality of content frames are at least partially static, wherein the distance value is calculated based on values of corresponding pixels of the plurality of content frames.

3. The method of claim 1, wherein the plurality of content frames are frames of a still advertisement, a splash screen, an emergency alert, or an intentionally static content item.

4. The method of claim 1, wherein the outputting the one or more second signals is further based on timestamps associated with the plurality of content frames.

5. The method of claim 1, wherein the one or more first signals comprise error messages associated with the plurality of content frames.

6. The method of claim 1, wherein the outputting the one or more second signals comprises sending the one or more second signals to the plurality of computing devices.

7. The method of claim 1, further comprising determining, based on hashes of one or more of the plurality of content frames, that the plurality of content frames are at least partially static.

8. An apparatus comprising:

one or more processors; and memory storing instructions that, when executed by the one or more processors, configure the apparatus to:

receive, from a plurality of computing devices, one or more first signals indicating that the plurality of computing devices each outputted a plurality of content frames that are at least partially static; and output, based on a determination of a threshold being satisfied by the plurality of computing devices that outputted the plurality of content frames that are at least partially static, one or more second signals that indicate the plurality of content frames were correctly outputted by the plurality of computing devices.

9. The apparatus of claim 8, wherein the instructions, when executed by the one or more processors, further configure the apparatus to determine, based on a distance value being below a predetermined value, that the plurality of content frames are at least partially static, wherein the distance value is calculated based on values of corresponding pixels of the plurality of content frames.

10. The apparatus of claim 8, wherein the plurality of content frames are frames of a still advertisement, a splash screen, an emergency alert, or an intentionally static content item.

11. The apparatus of claim 8, wherein the instructions, when executed by the one or more processors, configure the apparatus to output the one or more second signals further based on timestamps associated with the plurality of content frames.

12. The apparatus of claim 8, wherein the one or more first signals comprise error messages associated with the plurality of content frames.

13. The apparatus of claim 8, wherein the instructions, when executed by the one or more processors, configure the apparatus to output the one or more second signals by sending the one or more second signals to the plurality of computing devices.

14. The apparatus of claim 8, wherein the instructions, when executed by the one or more processors, configure the apparatus to determine that the plurality of content frames are at least partially static by determining, based on hashes of one or more of the plurality of content frames, that the plurality of content frames are at least partially static.

15. One or more nontransitory computer-readable media storing instructions that, when executed, cause performance of actions comprising:

receiving, from a plurality of computing devices, one or more first signals indicating that the plurality of computing devices each outputted a plurality of content frames that are at least partially static; and outputting, based on a determination of a threshold being satisfied by the plurality of computing devices that outputted the plurality of content frames that are at least partially static, one or more second signals that indicate the plurality of content frames were correctly outputted by the plurality of computing devices.

16. The one or more nontransitory computer-readable media of claim 15, wherein the instructions, when executed, further cause determining, based on a distance value being below a predetermined value, that the plurality of content frames are at least partially static, wherein the distance value is calculated based on values of corresponding pixels of the plurality of content frames.

17. The one or more nontransitory computer-readable media of claim 15, wherein the plurality of content frames are frames of a still advertisement, a splash screen, an emergency alert, or an intentionally static content item.

18. The one or more nontransitory computer-readable media of claim 15, wherein the instructions, when executed, cause outputting the one or more second signals further based on timestamps associated with the plurality of content frames.

19. The one or more nontransitory computer-readable media of claim 15, wherein the one or more first signals comprise error messages associated with the plurality of content frames.

20. The one or more nontransitory computer-readable media of claim 15, wherein the instructions, when executed, cause outputting the one or more second signals by sending the one or more second signals to the plurality of computing devices.

21. The method of claim 1, wherein the determination of the threshold being satisfied by the plurality of computing devices comprises a determination that a quantity of the plurality of computing devices exceeds the threshold.

* * * * *